Patented May 2, 1950

2,505,811

UNITED STATES PATENT OFFICE 2,505,811

ESSENCE OF MUSHROOM AND ITS PREPARATION

Joseph Szuecs, Yonkers, N. Y., assignor of one-tenth to George M. Wiles, Roslyn, N. Y.

No Drawing. Application December 6, 1947, Serial No. 790,227

8 Claims. (Cl. 99—140)

This invention relates to essence of mushroom, that is, a concentrate or extract having the characteristic flavor and taste of edible mushrooms, such as Psalliota campestris. It also relates to the preparation of essence of mushroom in an advantageous manner.

The art has long sought essence of mushroom, for use in flavoring food materials. However, as far as is known, this has never been achieved. It is appreciated that it has been proposed heretofore to prepare so-called mushroom catsup or the like material from the fruiting body or sporophore; however, these do not appear to be attractive from the flavor viewpoint, and in addition the relative cost is rather prohibitive.

The growing of mushrooms, that is, the fruiting body or sporophore, is a complex and expensive procedure, and the cost of mushrooms is rather high. Moreover, the fruiting body has a relatively low content of the characteristic mushroom flavor and taste, that is, of the essence of the mushroom. This indicates that a less costly source of mushroom flavor and taste would be especially desirable, from the commercial viewpoint.

In accordance with the invention, it has been found that essence of mushroom may be prepared from mushroom mycelium, and that the mycelium may be grown in a commercially advantageous manner in a relatively short time. This is associated with the discovery that the content of essence of mushroom in the mushroom mycelium is far greater than the content thereof in the fruiting body or sporophore.

The objects achieved in accordance with the invention include the provision of essence of mushroom; the provision of methods of preparing essence of mushroom in a highly advantageous manner from mushroom mycelium; the provision of methods of rapidly growing abundant quantities of mushroom mycelium on relatively low cost and readily available substrate material; the provision of methods of recovering essence of mushroom from mushroom mycelium; and other objects which will be apparent as details or embodiments of the invention are set forth hereinafter.

In order to facilitate a clear understanding of the invention, the following specific embodiments are set forth.

Example 1

The following mixture is placed in a pressure vessel: 6000 g. peanut meal (the residue remaining after removal of the oil from peanuts), 6000 g. peat (dried), and 24,000 cc. 1 normal sulfuric acid.

This mixture is heated at 15 lbs. steam pressure for 30 minutes. Then there are mixed therewith: 6000 g. calcium carbonate ($CaCO_3$), 2000 g. ground wheat soaked in 5000 cc. water.

This substrate is inoculated with 1000 g. of mycelium (e. g., of Psalliota campestris) grown on a medium of the above-described composition, or grown on a cereal medium as known in the art. The mycelium is mechanically mixed with the substrate, in order to evenly distribute small particles (which may be of the order of about 1 cu. mm. volume of inoculum) throughout the substrate mass, preferably under sterile conditions. It is convenient to use a rotary drum or tumbler for effecting thorough or uniform distribution of the mycelium throughout the substrate mass. The inoculated substrate is then transferred under sterile conditions to a vessel provided with aeration means, for instance a vertical cylindrical glass vessel, provided with an air inlet at the bottom. The bottom of the body of substrate is advantageously supported on glass wool or the like, or on a perforated disk, to provide for the even distribution of the air into and through the substrate mass, which is of a crumbly or granular structure and air readily passes therethrough. The air is preferably filtered, e. g., passed through cotton, and then bubbled through water to humidify it prior to introduction into the inoculated substrate.

The inoculated substrate is preferably maintained at a temperature of about 25° C. Lower temperatures may be used, but at lower temperatures the growth of the mycelium is too slow, and 10° C. may be regarded as a practical lower limit. Higher temperatures may be used, up to temperatures at which the mycelium is killed or destroyed, and 35° C. may be regarded as a practical upper limit, in this example. The air is passed through the inoculated substrate at about 2000 cc. per minute, which is equivalent to approximately 0.40 volume of air per bulk volume of substrate per minute. A higher rate of air flow may be used, but this is not required since no apparent advantage would be obtained thereby. A lower rate of air flow may be used, provided there is supplied to the growing mycelium the oxygen required in its normal growth processes, and the rate of air passage is sufficient to maintain the carbon dioxide concentration below that which would destroy the growing organism (the tolerance of the growing organism for carbon dioxide is known to the art).

A dense growth of mycelium throughout the substrate is obtained in about 10 days. A shorter time may be employed, provided there are no zones in the substrate which are not covered with the mycelium, indicating incomplete growth. A longer time may be employed if desired, especially if an extremely dense growth is desired.

A preferred method of separating the essence of mushroom from the mycelium is by steam distillation under reduced pressure. The mycelium, together with the substrate on which it is grown, is placed in a distillation vessel, and steam is passed through the substrate. The contents of the vessel are maintained under a pressure of about 10 mm. Hg and at a temperature of 45° C. Vapors are condensed, and an aqueous colorless distillate having the pure taste and flavor characteristic of the mushroom, that is, essence of mushroom, is obtained. From 10 liters of material, five 50 cc. portions of distillate are obtained, all of which have the characteristic mushroom taste and flavor, that is, essence of mushroom. This is suitable for use in flavoring foods, and may be used advantageously to add mushroom flavor to canned mushrooms (which are known to be practically devoid of such flavor and taste). After the essence of mushroom is recovered from the mycelium substrate, the latter may be extracted with water, for instance in a Soxhlet type of extraction means, and a liquid having an appealing brown color, and also containing nutrient materials is obtained. This water extract may be combined with the above essence of mushroom to form a food flavoring medium having an attractive color as well as flavor and taste.

Alternatively, the mycelium and the substrate on which it is grown may be placed in an appropriate vessel, and sufficient water added to cover the material. The vessel is hermetically closed and heated in a steam sterilizer at atmospheric pressure for one hour, or more, and then allowed to cool. The liquid is separated therefrom in a press or by centrifugal means, or the like. This liquid contains the essence of mushroom, and also has an appealing color.

The essence of mushroom may be obtained by steam distillation from the fruiting body; however, the content of essence of mushroom in the mycelium is much greater than in the fruiting body or sporophore. Tests have indicated that the mycelium, together with the substrate on which it is grown, contains at least about 10 times as much of this essence as does the fruiting body, on a weight basis. The mass of mycelium with the substrate is regarded as containing about 10% by weight mycelium, and thus the content of essence of mushroom in the mycelium is regarded as at least about 100 times that of the fruiting body or sporophore. Of course, the fruiting body of other types of mushrooms (edible or even inedible) may be steam distilled to recover edible essence of mushroom.

Mycelium may be produced on a large scale by the above-described method, under industrial conditions, in a relatively short time (especially as compared to the 6 weeks or more required to produce the fruiting body or sporophore). The substrate is not readily susceptible to contamination, and is highly selective for mushrooms, thus assuring the predominance of a mushroom mycelium growth over the growth of interfering or contaminating organisms. The essence of mushroom is readily separated from the mycelium in an industrially advantageous manner.

It is especially desirable to use a substrate which will give a particularly dense mycelium growth. For this purpose, seed oil residues, such as cotton seed meal, coconut meal, peanut meal, soybean meal, and the like are particularly useful. They may be advantageously mixed with a cereal material, such as wheat or the like, and also with a fibrous lignin containing material, such as peat or the like. It is advantageous to treat the meal with mineral acid, that is, to subject it to acid hydrolyzation. After hydrolyzation, calcium carbonate or like calcium salt is preferably added, and the pH adjusted to within the range of 6 to 8. The water content of the material is preferably adjusted to within the range of 50 to 65% by weight. The substrate should be of a granular or crumbly texture, and should not be pasty or clogged; that is, it should be of such a structure that air will pass therethrough readily, and also be reasonably dense.

*Example 2*

Following the above procedure, a mixture of 2000 g. of coconut meal and 3000 cc. of 1 normal sulfuric acid is heated under 15 lbs. steam pressure for 15 minutes. In a separate vessel, 6000 g. of fine pearled barley is boiled in water for 10 minutes, and the excess water is removed in a suction filter; the residue weighing 18,150 g. This boiled barley is mixed with 1000 g. of finely pulverized calcium carbonate and then the hydrolyzed coconut meal is mixed therewith. The resulting substrate contains 62.7% water by weight.

This is inoculated with 500 g. of the mycelium grown on a medium of the same composition, mixed as described above, transferred under sterile conditions to an aerated container, and aerated at 1000 cc. of air per minute. A dense mycelium growth is obtained in 6 days. It is further processed as described above, and comparable essence of mushroom is obtained.

*Example 3*

Following the above procedure, 500 g. cotton seed meal, 150 g. of peat (dried) and 750 cc. of 1 normal sulfuric acid are mixed and heated under 15 lbs. steam pressure for 15 minutes; and then mixed with 250 g. of powdered calcium carbonate and 100 cc. of water. The resulting substrate contains 48.5% water by weight. It is inoculated with 180 g. mycelium grown on a medium of the same composition, and processed as described above. Comparable essence of mushroom is obtained thereby.

*Example 4*

Following the above procedure, 200 g. cotton seed meal is mixed with 300 cc. of 1 normal sulfuric acid and heated under 15 lbs. steam pressure for 15 minutes; and then mixed with 40 g. powdered calcium carbonate and 330 g. of hydrolyzed oathulls (that is, treated with alkali and washed with water; dry weight 144 g.). The water content of this substrate is 56% by weight. It is inoculated with 90 g. of mycelium grown on a medium of the same composition and then processed as described above. Comparable essence of mushroom is obtained thereby.

Following the above procedure, essence of mushroom may be obtained from the mycelium of other mushrooms, e. g., the *Psalliota rodmani, Psalliota fabaceus, Pleurotus ostreatus, Ployporus umbellatus, Cantharellus cibarius, Clavaria stricta, Tricholoma rutilans, Morchella esculenta, Morchella bispora, Gyromitra esculenta,* and

*Helvella elastica,* as the art will understand in view of the foregoing disclosures.

The above specific illustrations are for illustrative purposes only and are not to be regarded as necessary limitations of the invention, which includes variations and modifications which will be apparent to those skilled in the art, except as do not come within the scope of the appended claims, in which no attempt is made to claim the herein-described method of growing mushroom mycelium which forms the subject matter of divisional application Serial No. 104,821, filed July 14, 1949.

I claim:

1. Essence of mushroom having the characteristic taste and flavor of mushroom in the form of a distillate from mushroom mycelium.

2. A food flavor material comprising the essence of mushroom of claim 1 and a water extract of the material remaining after removing the essence of mushroom from a substrate which is overgrown with mushroom mycelium.

3. As a food flavor material, the water extract of a substrate which has been overgrown with mushroom mycelium, comprising the volatile and nonvolatile part of the extract.

4. A method of preparing essence of mushroom which comprises distilling the essence from mushroom mycelium.

5. A method of preparing essence of mushroom which comprises distilling the essence from substrate overgrown with mushroom mycelium.

6. A method of preparing essence of mushroom which comprises overgrowing mushroom mycelium on a substrate under aeration and distilling essence of mushroom therefrom.

7. A method of preparing essence of mushroom which comprises distilling the essence from mushroom mycelium grown on a seed oil residue substrate throughout which small mycelium inoculum particles have been dispersed.

8. A method of preparing essence of mushroom which comprises distilling the essence from mushroom mycelium grown on a seed oil residue substrate under aeration throughout which small mycelium inoculum particles have been dispersed.

JOSEPH SZUECS.

REFERENCES CITED

The following references are of record in the file of this patent:

UNITED STATES PATENTS

| Number | Name | Date |
|---|---|---|
| Re. 22,202 | Stoller | Oct. 13, 1942 |
| 1,869,517 | Sinden | Aug. 2, 1932 |
| 2,262,851 | Lescarboura | Nov. 18, 1941 |

OTHER REFERENCES

"Encyclopedia of Food" by Ward, New York, Number 50, Union Square, 1923, pages 333 and 334.

"The Chemical Senses" by Moncrieff, Leonard Hill Limited, 17 Stratford Place, W. 1, London, 1944, pages 317 and 318.